Jan. 6, 1953  S. S. KISTLER  2,624,556
HEAT EXCHANGE PEBBLE
Filed Dec. 2, 1950

INVENTOR.
SAMUEL S. KISTLER
BY
George Crompton
ATTORNEY

Patented Jan. 6, 1953

2,624,556

UNITED STATES PATENT OFFICE 2,624,556

HEAT EXCHANGE PEBBLE

Samuel S. Kistler, West Boylston, Mass., assignor to Norton Company, Worcester, Mass., a corporation of Massachusetts Application December 2, 1950, Serial No. 198,921

8 Claims. (Cl. 257—263)

The invention relates to heat exchange pebbles.

One object of the invention is to provide heat exchange pebbles which are resistant to thermal shock. Another object of the invention is to provide heat exchange pebbles which have sufficiently high softening temperature. Another object of the invention is to provide heat exchange pebbles which have adequate resistance to abrasion. Another object of the invention is to provide heat exchange pebbles having the best combination of resistance to thermal shock and to abrasion and high softening temperature so that, taken from all points of view, these pebbles are superior to those heretofore used. Another object of the invention is to produce heat exchange pebbles having one or more and preferably all of the good qualities hereinabove set forth at a reasonable price. Other objects of the invention are to provide satisfactory methods for the manufacture of such pebbles at reasonable cost. Another object of the invention is to provide a method for making a ceramic sphere within a sphere. Another object of the invention is to provide heat exchange pebbles of large thermal capacity (meaning capable of absorbing a relatively large number of units of heat) while being resistant to thermal shock. Another object of the invention is to provide relatively large heat exchange pebbles which are resistant to thermal shock.

Other objects will be in part obvious or in part pointed out hereinafter.

Figure 1:
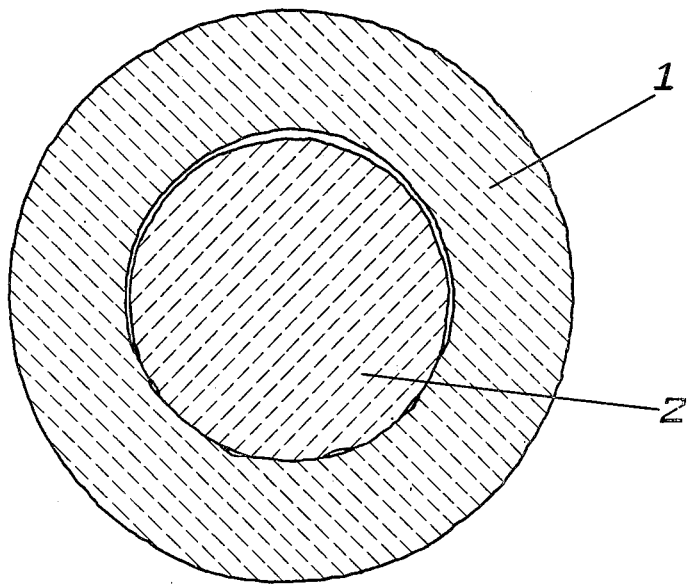
Figure 2:
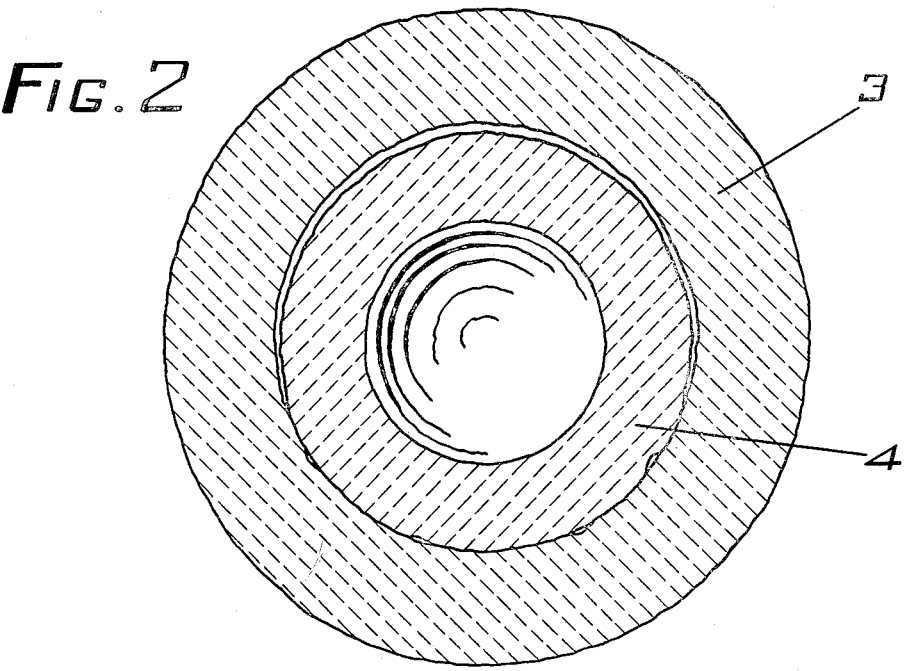

In the accompanying drawings illustrating some of many possible embodiments of my invention, Figure 1 is a cross sectional view on a greatly enlarged scale of a heat exchange pebble made according to Example I hereinafter given, Figure 2 is a cross sectional view on a greatly enlarge scale of a heat exchange pebble made according to Example II or Example III hereinafter given.

I provide refractory fines. The refractory material may be alumina or mullite or any other suitable refractory material which will sinter. Porcelain and zirconia can be used. Such materials as zircon and silicon carbide can also be used but in that event it is desirable to include a bonding material in the mixture. This bonding material may be clay or a mixture of clays reduced to powder form, or frits may be used. Many formulae for the manufacture of ceramic bodies are known and my invention is of general application for the manufacture of refractory heat exchange pebbles either by self-bonding of the refractory particles, known as sintering, or by bonding together the refractory powders such as silicon carbide fines by means of some ceramic bonding material. Even in the case of alumina, mullite, zirconia and magnesia which will readily sinter together it may be desirable to add a small amount of clay such as 1% of bentonite.

I further provide some fine grit of the same material as the fines. While this is a fine grit the particle size is very much larger than that of the fines. While this is usually the same material as that of the fines in specific cases it could be of different material. This fine grit forms the nuclei. In place of fine grit I could use organic material such as seeds. Rape seed is a good example of an organic material satisfactory for the purpose.

I further provide some water and some organic material of a sticky nature when wet. Dextrine is very satisfactory for this purpose. I further provide some rye flour, but other organic materials could be substituted, for example starch, wood flour, wheat flour, lycopodium powder and many others. I may also use readily oxidizable metal powders such as aluminum powder. I can also use gas black, charcoal or other burn-out materials.

EXAMPLE I

I will now give a specific example for the manufacture of heat exchange pebbles according to my invention. I provide a mixer and many styles of mixers might be used but I have had very good results using an open ended tub, made of brass the inside surface of which is substantially a truncated hollow sphere without any perceptible joints. This is mounted to rotate on an axis of about 30° inclination to the horizontal. This tub has a diameter of thirty-six inches and is rotated at thirty R. P. M. I now charge this tub with two tenths of a pound of No. 46 grit size alumina. This alumina is the white porous alumina made by calcining chemically precipitated alumina at 1700° C. It is about 99.5% pure or purer. I now start the tub rotating. I have available seven pounds of water and I start the water slowly flowing into the tub. I have available one hundred pounds of alumina fines of size No. 325 mesh and finer. This is the same kind of alumina as the No. 46 grit size alumina but it is very much finer. I have available five pounds of dextrine powder. While the tub is rotating and the water is slowly flowing into it, I start feeding into the tub the alumina fines and the dextrine. This is continued until spheres of about twenty hundredths of an inch have been formed. I then stop feeding alumina and dextrine but keep on feeding the water and sift into the tub over a five minute interval of time one tenth to two tenths of a pound of rye flour or one tenth of a pound of aluminum powder. At the end of the five minutes I start feeding alumina and dextrine again while continuing the flow of water. In all I am going to use seven pounds of water so the flow must be adjusted to give seven pounds of water in the total time. When I have added all of the one hundred pounds of alumina with the last bit of dextrine the spheres will have been built up to about thirty-five hundredths of an inch in diameter. I then remove them from the tub, put them on a tray and place them in a drying room over night. They may be dried in a heated drying room at about 200° F. or they may simply be dried at ordinary room temperature over a period of days or they may be dried in any other desired manner. The dried pebbles are now fired in a kiln at cone 35. (This can be done by heating to 1750° C. and holding at this temperature for three hours.) It will be found that each pebble is an alumina sphere 1 containing another alumina sphere 2 within it. The clearance between the two spheres is not very great, a matter of a few thousandths of an inch on the radius. Nevertheless this stops a crack from continuing all the way through and the outer sphere or shell 1 is able to deform without cracking while the inner sphere 2 is small enough so it is resistant to heat shock. It has been found that the larger these heat exchange pebbles are made, the more subject they are to heat shock. It might be thought that pebble beds could be made of very small spheres but the pressure drop in a gas stream forced through a pebble bed increases rapidly as the size of the pebble is decreased. Therefore large heat exchange pebbles are wanted but heretofore large pebbles have quickly gone to pieces. Hollow spheres are more resistant to heat shock but in the case of the ordinary hollow sphere there is a loss of mass for a given diameter which means a loss of capacity to absorb heat. But with my pebbles which comprise inner spheres and outer spheres there is very little loss of mass as compared with a solid sphere with the same diameter as the outer sphere of my pebble, and yet my pebbles are far more resistant to heat shock than solid spheres of the same diameter.

EXAMPLE II

I place one tenth of a pound of rape seed in the rotating barrel and add slowly and alternately water and a mixture of fine alumina of particle size between three and ten microns diameter with 10% by weight of ball clay. The water is added only in such quantity as to keep the surfaces of the rotating spheres sufficiently moist to pick up the added powder. The clay develops some plasticity and assists in forming a smooth, coherent ball. When the balls have attained a diameter of twenty-five hundredths of an inch, I cease the addition of the alumina-clay mixture and add finely powdered graphite until the balls are thoroughly coated with a layer a few thousandths of an inch thick. I then continue the addition of the alumina clay mixture with water until the balls have grown to a diameter of forty hundredths of an inch. They are then dried and fired as in Example I to produce hollow spheres 3 containing hollow spheres 4 within them. They are more resistant to cracking by heat shock than solid spheres since the hollow sphere can yield slightly to thermal strains without cracking whereas a solid sphere with the same diameter would be unable to yield without rupture.

As the balls grow, the volume of the batch increases until eventually it becomes inconvenient or impossible to handle them in the rotating barrel so that from time to time quantities are taken out to leave a convenient quantity in the barrel. These quantities of partly finished balls can then be finished in a subsequent operation.

EXAMPLE III

I provide a quantity of 2% solution of carboxymethyl cellulose in water. I also provide a quantity of the following mixture: 91% of aluminum oxide, described in Example II, 4% of finely ground calcined magnesium oxide, 2% finely ground calcium carbonate, 2% fine zircon powder and 1% finely ground boric acid. It is important that the alumina have a particle diameter between three and ten microns on the average, although a small fraction may be considerably coarser. The other constituents are preferably ground to the same fineness but may be substantially coarser.

I proceed in the same manner as in Example II to build up the composite spheres and after drying fire them at a temperature of 1600° C. The product is hard, strong and resistant to breakage by thermal shock.

It will be seen that, in accordance with this invention, my heat exchange pebbles consist of a sphere within a hollow sphere, and the clearance between them is a matter of a few thousandths of an inch on the radius. Since normally the bottom point of the inside sphere will rest upon the inside surface of the outside sphere, there will be twice this clearance at the top of the inside sphere, and an average of the above clearance on either side at the equator, considering that the poles are at the top and bottom. The clearance can be expressed as on the radius and it should be between two thousandths of an inch and twenty thousandths of an inch.

Both the inside and the outside spheres are made of refractory material. In Example I the spheres are made of alumina. In Example II they are made of alumina with 10% of clay which is, of course, vitrified in the firing operation. In Example III they are made of 91% alumina, the remainder being magnesia, calcium carbonate, zircon and boric acid. This alumina of Examples II and III was actually the same kind of alumina (only of different particle size) as in the case of Example I. However, any other refractory ceramic material, or mixture of refractory ceramic materials, can be used to make pebbles according to this invention, provided the melting point of the pebbles (both spheres) is at least 1500° C., meaning 1500° C. or higher. Such materials which can be used to make pebbles according to this invention include mullite ($3Al_2O_3.2SiO_2$), spinel ($MgO.Al_2O_3$), zircon ($ZrO_2.SiO_2$), zirconia ($ZrO_2$) stabilized zirconia, e. g. $ZrO_2+3\%$ to 6% CaO in solid solution, porcelain, and silicon carbide. In the case of silicon carbide, some ceramic bonding material such as ball clay should be added to the mix, and can be added with any of the others, as in Examples II and III. Ball clay or other fire clay alone can be used. The procedure of manufacture can be the same as already described in the detailed examples or any reasonable variation thereof.

With regard to the size of the pebbles, preferably they are anywhere from .20 inch to 1.0 inch in diameter and the diameter of the inner spheres is preferably anywhere between .10 inch to .75 inch. It will be understood, of course, that, though I refer to the two portions of the pebbles as spheres, they are approximately rather than exactly such. The organic material referred to in the examples and also the graphite substantially dissappears in the firing operation, leaving only traces of ash or the like. The gases generated by the burning of the organic material and the graphite mostly escape but any remaining does no harm. In Examples II and III both the inner and outer spheres are hollow, and the spherical void in the inner sphere has a diameter of about .15 inch. There is an advantage in having the inner sphere hollow in the larger sizes of pebbles and in such cases the diameter of the void should be from 5% to 70% of the diameter of the inner sphere.

It will thus be seen that there has been provided by this invention heat exchange pebbles in which the various objects herein above set forth together with many thoroughly practical advantages are successfully achieved. As many possible embodiments may be made of the above invention and as many changes might be made in the embodiments above set forth, it is to be understood that all matter hereinabove set forth is to be interpreted as illustrative and not in a limiting sense.

I claim:

1. A heat exchange pebble consisting of an outer shell which is approximately spherical and is hollow, and an approximate sphere within said shell, each of the outer shell and the sphere within being made of refractory ceramic material the melting point of which is at least 1500° C., there being a clearance between the outer shell and the sphere within which on the average on the radius is between .002 inch and .020 inch.

2. A heat exchange pebble according to claim 1 in which the outer shell has a diameter between .20 inch and 1.0 inch and the sphere within has a diameter between .10 inch and .75 inch.

3. A heat exchange pebble according to claim 2 in which the sphere within is hollow and the void therein has a diameter of from 5% to 70% of the diameter of the sphere within.

4. A heat exchange pebble according to claim 3 in which the outer shell and the sphere within are both made of alumina.

5. A heat exchange pebble according to claim 1 in which the sphere within is hollow and the void therein has a diameter of from 5% to 70% of the diameter of the sphere within.

6. A heat exchange pebble according to claim 5 in which the outer shell and the sphere within are both made of alumina.

7. A heat exchange pebble according to claim 1 in which the outer shell and the sphere within are both made of alumina.

8. A heat exchange pebble according to claim 7 in which the outer shell has a diameter between .20 inch and 1.0 inch and the sphere within has a diameter between .10 inch and .75 inch.

SAMUEL S. KISTLER.

REFERENCES CITED

The following references are of record in the file of this patent:

UNITED STATES PATENTS

| Number | Name | Date |
|---|---|---|
| 2,212,932 | Fairlie | Aug. 27, 1940 |
| 2,478,757 | Foster | Aug. 9, 1949 |
| 2,553,759 | Geiger | May 22, 1951 |